April 25, 1933.　　R. C. WHELCHEL　　1,906,030
ARMATURE TEST MACHINE
Filed May 6, 1931　　4 Sheets-Sheet 1
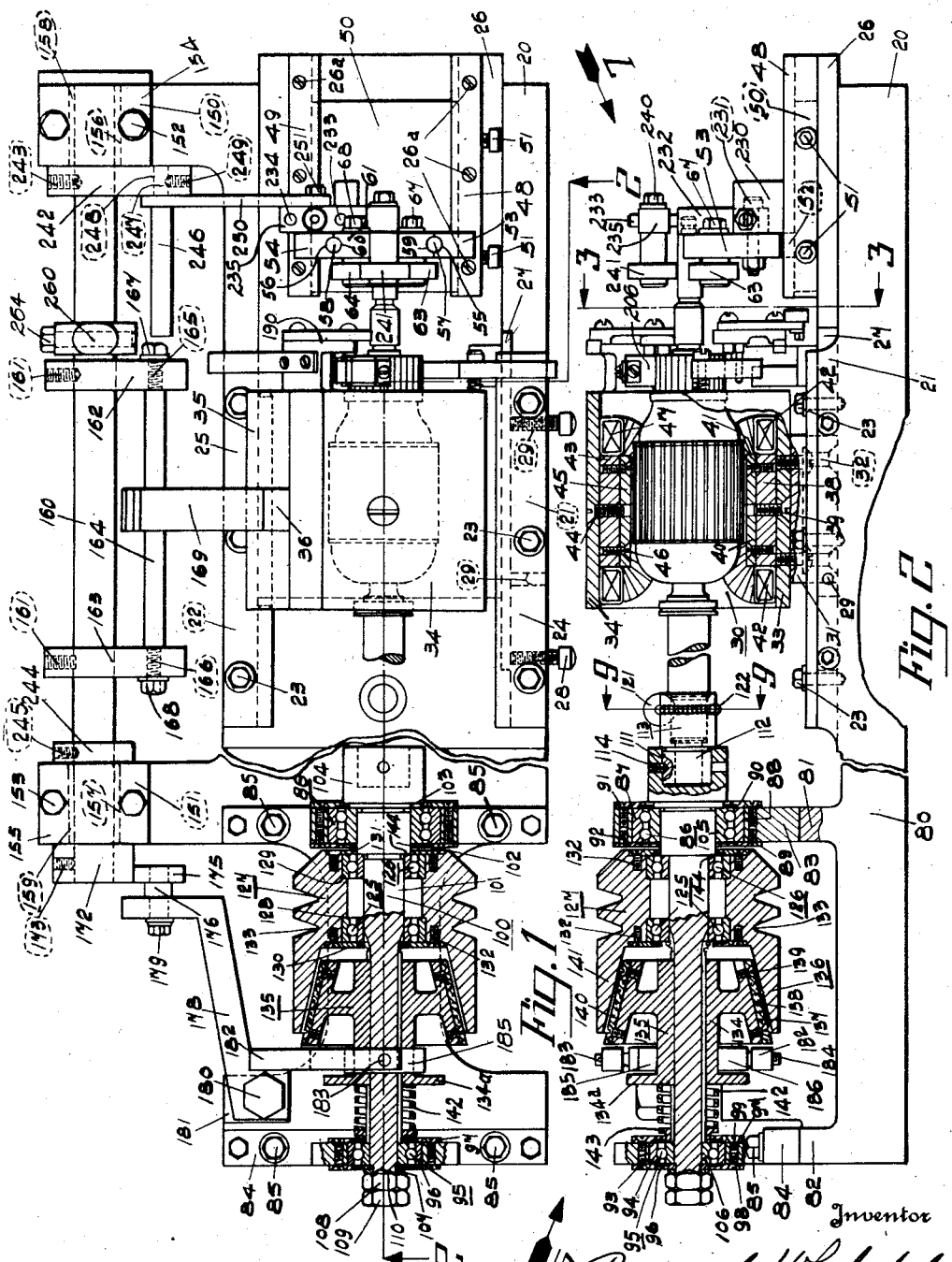

April 25, 1933.   R. C. WHELCHEL   1,906,030
ARMATURE TEST MACHINE
Filed May 6, 1931   4 Sheets-Sheet 2
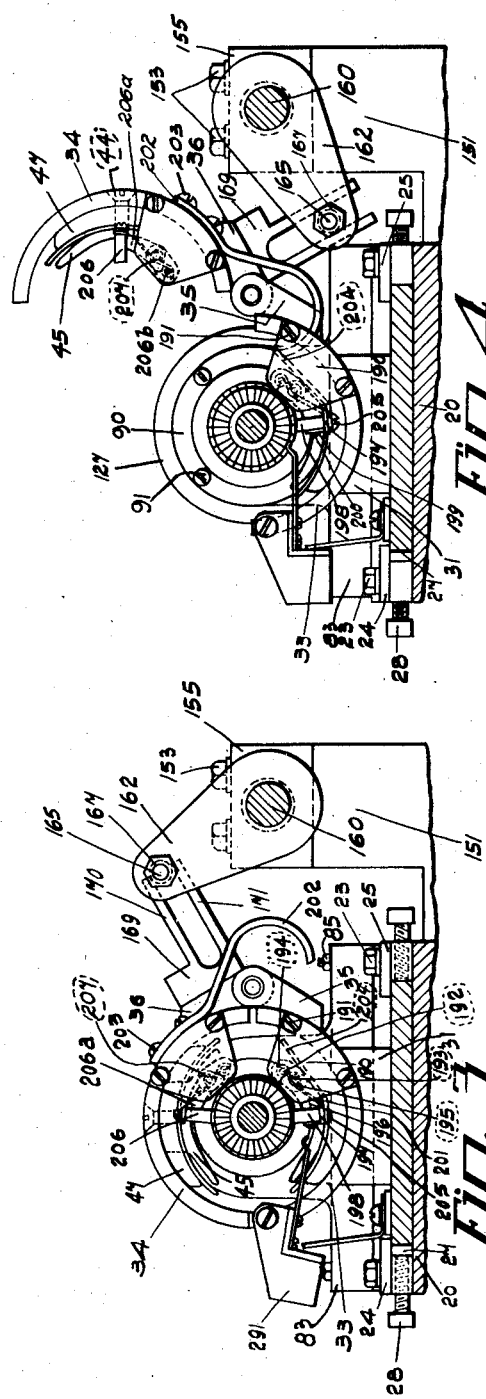
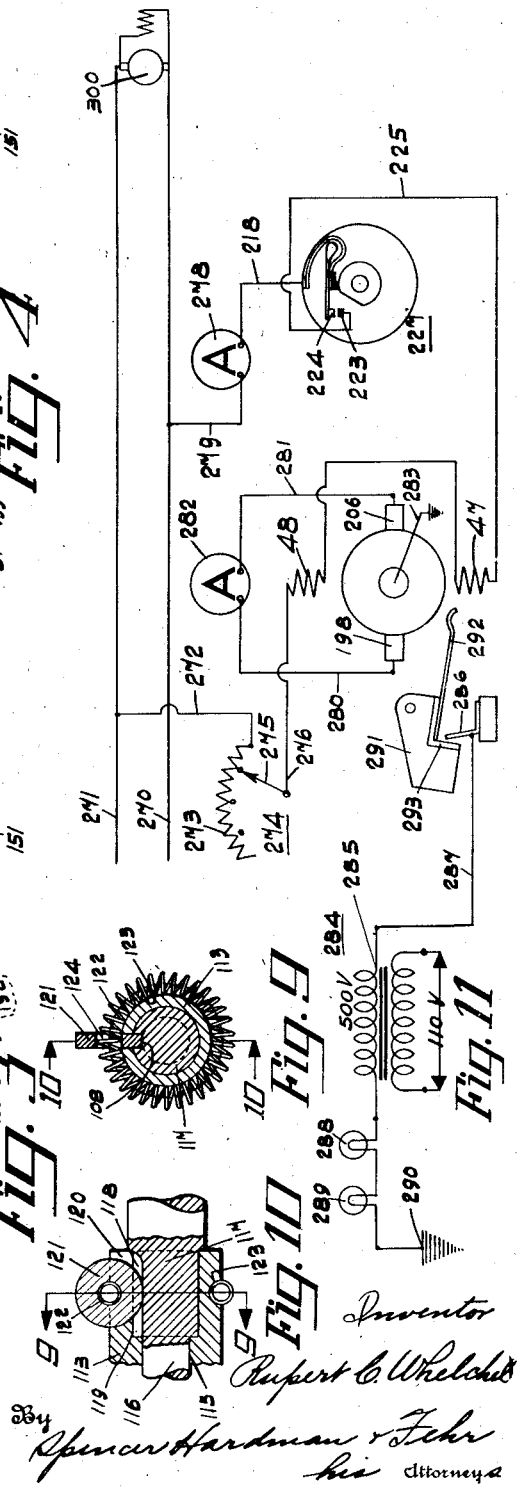

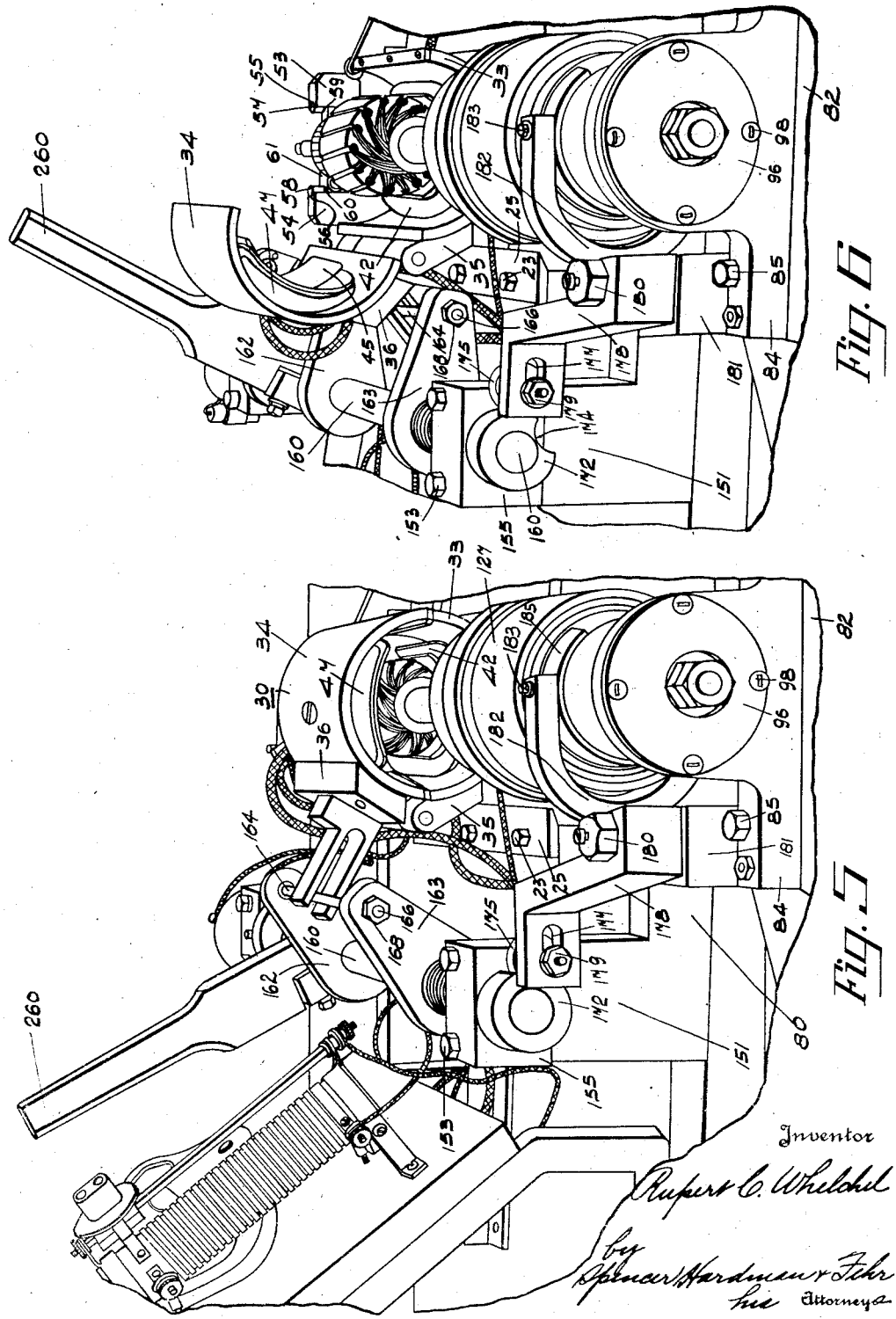

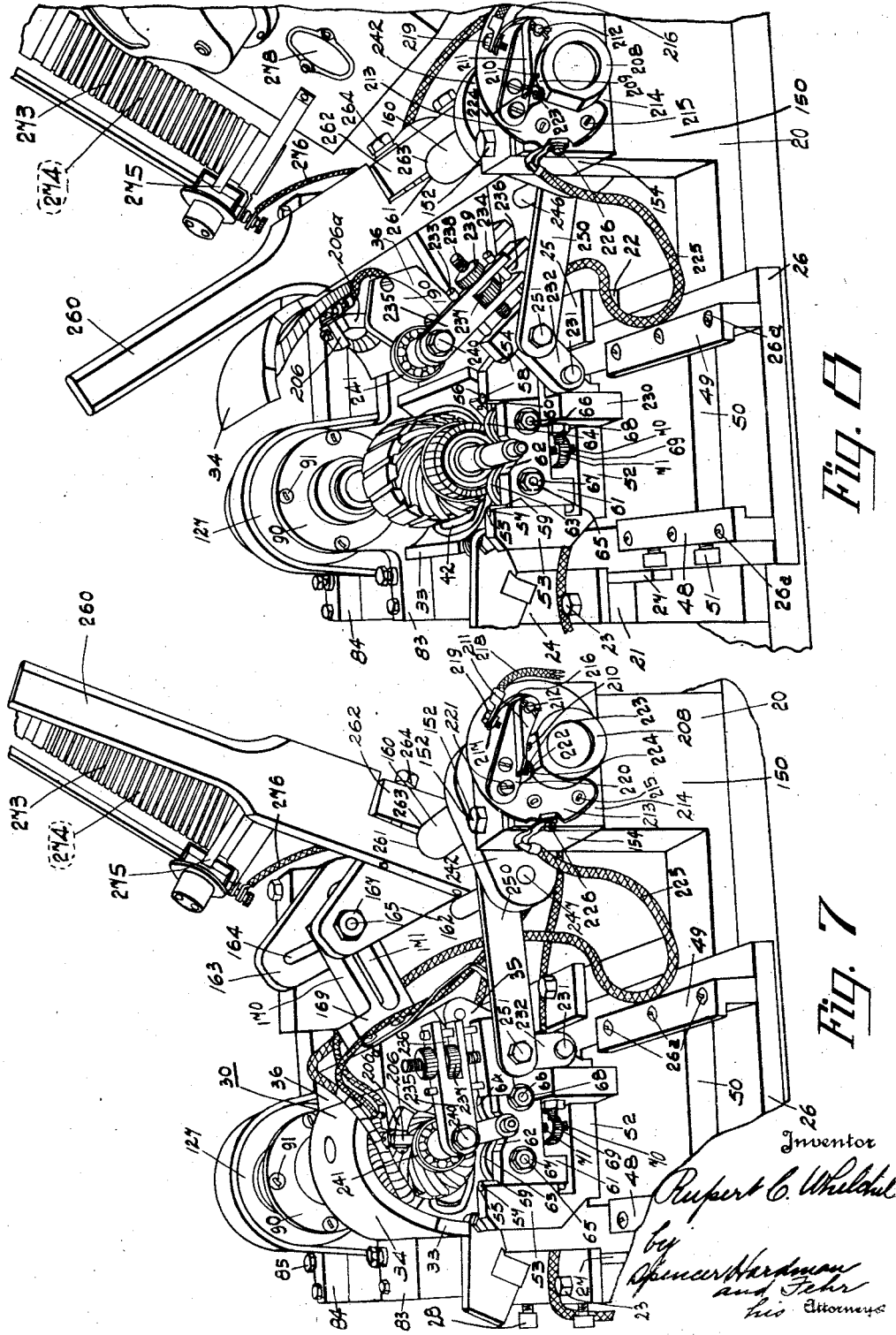

Patented Apr. 25, 1933                                         1,906,030

UNITED STATES PATENT OFFICE

RUPERT C. WHELCHEL, OF ANDERSON, INDIANA, ASSIGNOR TO DELCO-REMY CORPORATION, OF ANDERSON, INDIANA, A CORPORATION OF DELAWARE

ARMATURE TEST MACHINE

Application filed May 6, 1931. Serial No. 535,393.

This invention relates to apparatus for testing the armatures in dynamo electric machines and more particularly the armatures of generators.

The object of the present invention is to provide an armature testing machine which will detect irregularities in the winding or construction of the armature, and in order to accomplish this object there is provided means for causing the armature to generate electric current under the same conditions as are present when the armature is operated with the other parts of the dynamo electric machine of which the armature is a part. More specifically, the testing machine provides a field frame having pole pieces and fields which are the counter part of the pole pieces and fields of the actual machine of which the armature is a part. While the armature is caused to rotate varying amounts of current are delivered to the field windings of the machine and certain readings are taken of an ammeter which is connected with brushes which are caused to bear against the commutator of the armature. In order to facilitate the assembling of the armature for test purposes with the field magnet and brushes of the testing machine, the frame of the field magnet is provided with a movable part carrying one of the pole pieces. When this movable pole piece has been moved away from a relatively stationary pole piece the armature can be easily mounted upon a supporting means which permits the armature to rotate and the armature can be easily connected with a rotatable shaft connectible with a source of mechanical power by a suitable clutch.

A further object of the invention is to provide mechanisms operated by a single control member in order that, when the movable field pole is moved in a cooperative relation with the armature, the armature is automatically caused to rotate, brushes are automatically caused to bear upon its commutator, and the field windings of the testing apparatus are automatically connected with the source of current.

A still further object of the present invention is to provide means for testing for short circuits or grounds between the commutator bars and the armature shaft while the armature is still in position in the machine which tests its performance.

Further objects and advantages of the present invention will be apparent from the following description, reference being had to the accompanying drawings wherein a preferred embodiment of one form of the present invention is clearly shown.

In the drawings:

Fig. 1 is a plan view of the device embodying the present invention, certain parts being shown in section.

Fig. 2 is a sectional view taken on the line 2—2 of Fig. 1, certain parts being omitted.

Fig. 3 is a fragmentary, sectional view taken on the line 3—3 of Fig. 2.

Fig. 4 is a fragmentary, sectional view similar to Fig. 3 and shows the movable part of the field frame in such position which is necessary for mounting the armature upon its supporting means.

Figs. 5 and 6 are fragmentary, perspective views looking in the direction of the arrow 5 of Fig. 2.

Fig. 6 shows the movable part of the field frame in a position corresponding with that of Fig. 4.

Figs. 7 and 8 are fragmentary perspective views looking in the direction of the arrow 7 of Fig. 2.

Fig. 8 differs from Fig. 7 by showing the movable part of the field frame in a position corresponding with that of Figs. 4 and 6.

Fig. 9 is a sectional view of the chuck taken on the line 9—9 of Figs. 2 and 10 and drawn to a larger scale.

Fig. 10 is a sectional view through the chuck taken on the line 10—10 of Fig. 9 and also drawn to a larger scale.

Fig. 11 is a wiring diagram, showing the various circuits and control means for such.

Referring to the drawings a table 20 being supported by any suitable pedestal comprises parallel ways 21 and 22 to which are attached by screws 23 guide plates 24 and 25, respectively, for guiding a rectangular base plate 26 in horizontal direction. A wear plate 27 is urged against the base plate 26 by screws 28 which are received by threaded holes 29 in the way 21 thus clamping the base plate 26 in a desired position.

A field frame 30 is carried by a support 31 mounted on the base plate 26 by screws 32 as best seen in Fig. 2. The field frame 30 consists of two halves or parts 33 and 34, part 33 is rigidly mounted and part 34 is pivotally mounted with respect to the base plate 26. A hinge member 35 attached to the lower stationary field part 33 in any suitable manner telescopes with and pivotally supports another hinge member 36 attached in a similar manner to the movable frame part 34.

A pole piece 38 attached to the stationary frame part 33 by a screw 39 carries a pole shoe 40 secured thereto by a plurality of screws 41. A field winding 42 is surrounding the pole piece 38. Similarly, a pole piece 43 attached to the movable frame part 34 by a screw 44 carries a pole shoe 45 secured thereto by screws 46. A field winding 47 surrounds the pole piece 45.

A pair of parallel guide pads 48 and 49 attached to the base plate 26 by screws 26a form a dove-tail shaped guide for horizontal movement of a support plate 50. The set screws 51 threaded through the guide pad 48 clamp the support plate in any desired position. The support plate 50 carries a bracket 52, providing two parallel extensions 53 and 54 having semicircularly shaped, opposed faces 55 and 56, respectively, for receiving bolts 57 and 58, respectively, said bolts 57 and 58, also being received by semicircularly shaped end faces 59 and 60, respectively, of a slide 61 which is provided with a triangular notch 62 on top so that the armature shaft entirely clears the slide 61 when rotatably supported between two ball bearing rollers 63 and 64. These rollers 63 and 64 are rotatably mounted upon the bolts 65 and 66, respectively, which in turn are received by holes in the slide 61 and secured in position by lock nuts 67 and 68, respectively. A knurled hand disc 69 provides left and right hand threaded portions 70 and 71 respectively, received by correspondingly threaded holes in the bracket 52 and the slide 61 for moving the slide vertically relative to the bracket 52.

The table 20 having a longitudinal extension 80 provides two parallel pads 81 and 82, each of which supports a bearing bracket 83 and 84 respectively and is secured thereto by screws 85. A ball bearing 86 with its outer shell 87 is received by an annular recess 88 of the bearing bracket 83 and held in position by ball bearing retainers 89 and 90 secured to the said bracket 83 by screws 91 and 92, respectively. Likewise, an annular recess 93 in the bearing bracket 84 receives the outer shell 94 of a ball bearing 95, held axially relative to the said bracket 84 by two opposed ball bearing retainers 96 and 97 that are secured to said bracket by screws 98 and 99, respectively.

A shaft 100 comprises four portions of different diameter which are best shown in Figs. 1 and 2 by the reference numerals 101 and 104, and is journalled with its portions 101 and 102 in the inner shells 106 and 105 of the ball bearings 95 and 86. Axial thrust of the shaft 100 is taken up by the rather short portion 103 which bears against the inner shell 105 of the ball bearing 86, and washers 107 which are caused to bear against the inner shell 106 of the ball bearing 95 by nut 108 and lock nut 109, received by the threaded end 110 of the shaft 100.

The diametrically largest portion 104 of the shaft 100 provides an aperture 111 which receives a reduced cylindrical portion 112 of a chuck 113. A set screw 114 threaded through the portion 104 firmly holds the reduced portion 112 of the chuck 113 within the aperture 111.

Referring more particularly to Figs. 9 and 10, the chuck body 113 comprises an aperture 115 for rotatably supporting the outermost end 116 of the armature shaft; a diametrically larger portion 117 of the armature shaft which is provided with a keyway 118 is received by an aperture 119 which forms a part of the aperture 115. A longitudinal slot 120 in the chuck body 113 receives a circular key 121, which is received by the keyway 118 of the armature shaft portion 117, so that the chuck 113 will drive the armature. A spiral spring 122 encircling the chuck body 113 and yieldingly confined within a circumferential groove 123 passes through a center hole 124 of the key 121, thus normally maintaining the periphery of the key 121 at a distance from the axis of the chuck body 113 which is equal to the distance of the bottom of the groove 118 from the axis of the armature shaft.

From the description so far it is obvious that the ball bearing rollers 63 and 64 and the aperture 115 of the chuck 113 rotatably support the right and left hand end respectively of the armature shaft while the key 121 when projecting into the keyway 118 of the armature shaft is adapted to transmit rotative movement from the chuck 113 to the armature. Means for rotating the chuck 113 will now be described.

The portion 101 of the chuck carrying shaft 100 supports ball bearings 125 and 126 adapted to loosely support a pulley 127 upon the shaft 100. Annular shoulders 128 and 129 provided by the pulley 127 space the ball bearings 125 and 126 from each other and ball bearing retainers 130 and 131, respectively, secured to the pulley 127 by screws 132 maintain the said bearings 125 and 126 in engagement with their respective annular shoulders 128 and 129. The pulley 127 is provided with a plurality of wedge shaped circumferential grooves 133 for receiving a wedge shaped belt which imparts rotative motion to the pulley 127 from any suitable source of power.

The greater length of the shaft portion 101 is splined and axially slidably supports the internally splined hub 134 of a clutch half 135, which together with the axially stationary counter-half 136 might be of any suitable yielding clutch type. In the present instant the clutch-half 135 comprises a conical surface 137 covered with suitable brake material 138 and secured thereto by suitable screws 139 and is adapted to normally yieldingly engage the inner conical surface 140 of an extension 141 of the pulley 127 under the tension of a spring 142 which bears against a flange 134a which forms a part of the hub 134 of the pulley 127 and through the intermediate spring plate 143 and the inner shell 106 of the ball bearing 95 against the washers 107. The axial thrust of the pulley 127 due to the yielding action of the spring 142 imparted through the intermediate members 135, 138, 141 and 126 is taken up by the annular shoulder 144 of the shaft 100, formed by the step down from portion 102 to 101. Means for shifting the axially slidable clutch-half 135 out of engagement with the axially stationary clutch-half 141 which forms a part of the pulley 127 against the tension of the spring 142 shall be described later.

Integral with the table 20 are two supporting blocks 150 and 151 which have secured thereto by bolts 152 and 153 bearing blocks 154 and 155 respectively; each of the bearing blocks 154 and 155 providing an annular recess 156 and 157 respectively adapted to support bushings 158 and 159, respectively, which rotatably support a shaft 160. Adjustably secured by set screws 161 to the shaft 160 are crank arms 162 and 163 connected at their outer ends by a bar 164 which takes the place of the usual crank pin. The bar 164 comprises reduced threaded end portions 165 and 166 which project through holes in the crank arms 162 and 163, respectively, and receive nuts 167 and 168, respectively for securely fastening the bar 164 to the crank arms 162 and 163. A forked bracket 169, secured to the hinge member 36 in any suitable manner receives the bar 164 between the forked ends 170 and 171. It is thus obvious that an angular motion of shaft 160 initiates the turning of the frame part 34 about its pivot as can be readily understood from Figs. 3 and 4.

Referring now to Figs. 1, 2, 5 and 6, the left end of the shaft 160 which projects from the bearing bracket 155 has attached thereto a disc 172 by means of a set screw 173. The disc 172 is provided with an arcuate notch 174 adapted to temporarily engage with a roller 175 which is rotatably mounted upon a pivot 176, adjustably secured within a slot 177 to a clutch shift lever 178 by a nut 179. The said clutch shift lever 178 which is pivoted about a bolt 180 threaded into a boss 181 integral with the table 20, carries a fork 182 adapted to pivotally engage with diametrically opposed pins 183 and 184 extending from disc halves 185 and 186, respectively, secured together in any suitable manner and slidably supported by the center boss 134 of the pulley 127. The flange 134a of the pulley 127 is permanently urged against the abutting disc halves 185 and 186 due to the tension of the spring 142 which yields to turn the clutch shift lever in a counterclockwise direction about its pivot and results in a pressing of the roller 175 upon the periphery or in the arcuate notch 174 of the disc 172. Figs. 5 and 6 clearly show how the different positions of the notch 174 with respect to the roller 175 control the engagement and disengagement of the clutch parts 135 and 141.

Referring more particularly to Figs. 3 and 4, a bracket 190 secured to the stationary frame part 33 by screws 191 carries pins 192 and 193, adapted for engaging the straight end 194 of a spiral spring 195, respectively pivotally supporting the said spring 195 and also the two legs of a U-shaped brush-holder 196, said brush holder providing an upwardly bent lap 197 for supporting a commutator brush 198. A retainer 199 which receives a screw 200 passing through a notch of the brush 198 and threaded into the yoke of the said brush holder 196 secures the brush 198 to the yoke of the said holder 196. The other straight end 201 of the spiral spring 195 yieldingly supports the yoke portion of the brush holder 196 and tends to hold the brush holder in such position that the end of the brush adapted to bear against the armature commutator extends closer to the axis of the supported armature than the peripheral surface of the commutator is distant from the same axis. This results in a yielding of the spring supported brush holder 196 with the brush 198 when a new armature has been placed upon the rotatably supporting means, thus effecting a yielding engagement of the brush 198 with the commutator of the armature.

To prevent engagement of the brush 198 with the commutator of a newly placed armature while the movable part of the frame is still in a position to allow the interchanging of armatures as shown in Fig. 4, an arm 202, secured by screws 203 to the movable frame part 34 is adapted to engage an arm 204, secured by a screw 205 to the lap 197 of the brush holder 196 and fulcrumed upon the legs of the said brush holder 196, thus overcoming the yielding of the brush 198 toward the commutator and withholding the brush from engagement with the commutator.

A second brush 206 is carried by the movable frame part 34 in substantially the same manner as brush 198 is carried by frame part 33 with the exception that brush 206, when out of engagement with the commutator of an armature is moved by the spiral spring 207 until its brush holder 206a engages the stop pin 206b which also retains one straight end of the spring 207.

Referring to Figs. 7 and 8, the end of the shaft 160 which projects from the bearing block 154 has rigidly mounted thereon in any suitable manner and rotatable therewith a cam disc 208 which peripheral surface 209 is adapted to engage with a rubbing block 210 of insulating material carried by a contact arm 211 which is pivotally and nonconductively supported by a pivot 212 carried by a breaker plate 213 of conductive material, secured to an insulating plate 214 by screws 215. The insulating plate 214 is secured to the bearing block 154 in any suitable manner. A conductive leaf spring 216 is nonconductively secured in any suitable manner with its one end to a lap 217 projecting from the breaker plate 213 and conductively secured with its other end to the contact arm 211 in such manner as to urge the rubbing block 210 which is carried by the said contact arm 211 against the peripheral surface 209 of the cam disc 208. A wire 218 is conductively connected to the leaf spring 216 and secured to said spring and the supporting lap 217 by a screw 219 which is threaded into the said lap 217.

Pivotally and conductively mounted upon the pivot 212 but insulated from the contact arm 211 is a bracket 220 which is concentrically adjustable with respect to the pivot 212 and secured to the breaker plate 213 in such adjusted position by screws 221. The said bracket 220 comprises an upwardly bent lap 222 which carries a contact point 223 adapted to conductively engage a contact point 224 carried by the contact arm 211 when the rubbing block 210 is allowed to descend due to the moving of the flat of the cam disc 208 underneath the said rubbing block as can be readily seen in Fig. 7. A wire 225 connects the field windings 47 and 42 with a terminal 226 provided by the breaker plate 213. Thus an angular motion of the cam disc 208 from the position shown in Fig. 8 to that shown in Fig. 7 allows engagement of the two contact points 223 and 224.

Referring now to Figs. 1, 7 and 8, a block 230 adjustably secured to the forked bracket 52 in any suitable manner carries a pivot 231 for rotatably supporting a T-shaped bar 232 comprising parallel extending pins 233 and 234 for slidably supporting a cross bar 235. The cross bar 235 is provided with a notch 236 of such width that a nut 237 which receives a stud 238 tightly threaded into the T-shaped bar 232 abuts the sidewalls of the notch 236. A nut 239 which has the same knurled peripheral surface as the nut 237 is received by the stud 238 on top of the cross bar 235 and is adapted to securely clamp the said cross bar to the nut 237, while the said nut 237 is adapted to adjust the cross bar relative to the T-shaped bar 232. A pivot 240 carried by the said cross bar rotatably supports a ball bearing roller 241 of substantially the same dimensions as the rollers 63 and 64, said roller 241 being adapted to bear upon the armature shaft and form together with the rollers 63 and 64 a three point bearing for the same.

A crank arm 242 rigidly mounted upon the shaft 160 by means of a set screw 243 abuts the bearing block 154, thus taking up axial thrust of the shaft 160 in one direction. A collar 244 adjustably secured to the shaft 160 by a set screw 245 abuts the bearing block 155 thus taking up axial thrust in the other direction. A rod 246 has a reduced portion 247 which fits through a hole 248 of the crank arm 242, a set screw 249 threaded into the said crank arm firmly secures the reduced portion 247 within the hole 248. Movably supported by the rod 246 is the one end of a connecting link 250, the other end is pivoted to the T-shaped bar 232 at 251. Thus, it will be understood that an angular motion of the shaft 160 causes the roller 241 to move from the position shown in Fig. 8 to that shown in Fig. 7, to wit, in engagement with the supported armature shaft through the train of motion transmitting means 242, 246, 250, 251, 232, 233, 234, 235 and 240.

A handle 260 provides a semicircular notch 261 which surrounds one half of the shaft 160, while a counter piece 262 providing a semicircular notch 263 for surrounding the other half of the shaft 160 is secured to the handle 260 by screws 264. The so surrounded shaft 160 is rotatable with the handle 260.

A schematic wiring diagram, shown in Fig. 11 discloses the different circuits and electrical instruments of the device which together with the described mechanical arrangement enable the operator to carry out the desired tests. The reference numerals 270 and 271 indicate lead wires connected with any suitable source of direct current such as a D. C. generator 300. A wire 272 connects the one side 271 of the generator 300 with the resistor 273 of a rheostat 274, the wiper 275 of which is connected to a wire 276, connected with the field windings 48 and 47. The wire 225 connects the field winding 47 with the stationary contact 223 of a switch 227. The movable contact 224 of the said switch is connected by a wire 218 to one terminal of an ammeter 278, the other terminal of which is connected with the other line wire 270 connected with the generator 300 by a wire 279. The commutator brushes 198 and 206 are connected by wires 280 and 281, respectively, with the terminals of an ammeter 282, which indicates the currents generated in the armature while the field current is varied by the rheostat 274. The armature shaft is grounded by ground connection 283.

An auxiliary high voltage ground test at the armature necessitates the following arrangement: A transformer 284 with a ratio of approximately 5:1 has one terminal of its secondary winding 285 connected to a yieldingly supported stationary contact 286 by a wire 287 while the other terminal of the secondary 285 is connected in series with lamps 288 and 289 grounded at 290. The primary winding is connected to 110 volt lighting circuit. An insulated pivotally supported bracket 291 carries a conductive flexible blade 292 adapted to engage with the armature commutator when the first described test is finished and the armature is stationary. A manual tipping of the said bracket 291 causes engagement of the said stationary contact 286 with a conductive angle 293, secured to the said bracket and conductively secured to the blade 292 in any suitable manner, and engagement of the said conductive blade with the commutator when stationary. No current will flow through the circuits just described if the armature windings and commutator bars are properly insulated from the ground. If, however, either an armature winding or a commutator bar or several of each are grounded, a current will flow to the ground at the respective faulty place or places and the lamps 288 and 289 will light up.

Having described all the parts of the machine, the sequence of operations of the device shall now be described.

The operator places an armature to be tested upon its supporting means, i. e. he shoves the armature end which provides the keyway 118 into the recess 119 of the chuck 113 in such manner that the key 121 in the chuck is received by the keyway 118 of the said armature shaft end and places the other end of the armature shaft upon the two supporting rollers 63 and 64. The operator then shifts the handle 260 from the position shown in Fig. 8 to that shown in Fig. 7 and thus imparts an angular motion to the shaft 160 which effects movement of the movable field frame part 34 toward the stationary field frame part 33 as shown in Figs. 6 and 5; axial movement of the clutch driven member 135 into engagement with the clutch driving member 141 to impart rotation from a source of mechanical power through the pulley 127 to the chuck carrying shaft 100 for rotating the armature, said object being accomplished by the cam controlled shifting of the shifter fork carrying lever 178 as clearly shown in Figs. 5 and 6. Movement of the handle 260 also effects engagement of both brushes with the armature commutator as shown in Figs. 3 and 4, whereby the lower brush 198 and the upper brush 206 are caused yieldingly to engage the commutator due to the withdrawing of the arm 202 and the movement of the movable frame part 34 toward the stationary frame part 33. The lowering of the roller 241 to form together with the rollers 63 and 64 a three point bearing for the armature shaft is accomplished by motion of the crank arm 230 mounted upon the shaft 160 which imparts through the link 250 an angular motion to the bar 232 which supports the cross bar 235 carrying roller 241. Movement of handle 260 into the position shown in Fig. 8 finally effects the movement of the flat portion 208a of the cam 208 into such position that the rubbing block 210 is free of the cam 208 so that the movable contact 224 engages the stationary contact 223, thus closing the field circuit of the generator of which the armature to be tested is a part.

The armature now rotates at a definite speed and a current is generated which can be read by the operator on the ammeter 282. The operator now varies the field current by the use of the rheostat 274, the respective currents being readable on the ammeter 278. This results in variations of the generated current in the armature, the respective varying generated currents being readable on the ammeter 282. As the generated current should be a certain function of the field current, the operator compares several concurring field and generated currents and rejects the armature if the concurring armature currents do not come up to a certain standard. After having performed this test the operator shifts the handle 260 into original position again which is shown in Fig. 8, thereby causing the movement of the frame part 34 away from the armature, disengagement of the clutch members 135 and 141, withdrawal of the brushes 198 and 206 from the commutator, elevation of the roller 241 from the armature shaft and disconnection of the contacts 223 and 224 of the switch 277 thereby opening the field circuit.

The armature shaft now rests on the supporting means and is disconnected from a current source. The operator then tips the insulated bracket 291 to carry out the previously described auxiliary ground test.

It is obvious from the foregoing description that the method and apparatus of the present invention provides for the facile assembly of armatures to be tested with a field frame and for effecting by one simple manipulation of the operator a number of operations which render the armature to be tested operable as a part of a dynamo electric machine of which the field frame is the counterpart. Subsequent readings of the operator on the ammeters and tipping of an insulated switch bracket completes the tests to be made.

While the form of embodiment of the present invention as herein disclosed, constitutes a preferred form, it is to be understood that other forms might be adopted, all coming within the scope of the claims which follow.

What is claimed is as follows:

1. An armature testing device comprising, in combination, means for rotatably supporting an armature, a dynamo field frame having separable pole pieces and windings surrounding the pole pieces, commutator brushes movable with the separable pole pieces and normally engaging the commutator of the armature, and means for moving at least one of the pole pieces with a brush away from the other pole piece to permit the placing of the armature upon its supporting means, or for moving the pole piece with a brush toward the armature to provide a generator frame and engage said brush with the commutator of the armature.

2. An armature testing device comprising, in combination, means for rotatably supporting an armature, a dynamo field frame having separable pole pieces and windings surrounding the pole pieces, commutator brushes movable with the separable pole pieces and normally engaging the commutator of the armature and means for moving at least one of the pole pieces with a brush away from the other pole piece to permit the placing of the armature upon its supporting means, or for moving the pole piece with a brush toward the armature to provide a generator frame for engaging said brush with the commutator and for causing the armature to rotate.

3. An armature testing device comprising, in combination, means for rotatably supporting an armature, a dynamo field frame having separable pole pieces and windings surrounding the pole pieces, and means for moving at least one of the pole pieces away from the other to permit the placing of the armature upon its supporting means, or for moving the pole piece toward the armature to provide a generator frame and for connecting the field windings with a current source.

4. An armature testing device comprising, in combination, means for rotatably supporting an armature, a dynamo field frame having separable pole pieces and windings surrounding the pole pieces, and means for moving at least one of the pole pieces away from the other to permit the placing of the armature upon its supporting means, or for moving the pole piece toward the armature to provide a generator frame and for connecting a commutator brush with the commutator of the armature.

5. An armature testing device comprising, in combination, means for rotatably supporting an armature, a dynamo field frame having separable pole pieces and windings surrounding the pole pieces, and means for moving at least one of the pole pieces away from the other to permit the placing of the armature upon its supporting means, or for moving the pole piece toward the armature to provide a generator frame and for causing the armature to rotate and to connect the field windings with a current source.

6. An armature testing device comprising, in combination, means for rotatably supporting an armature, a dynamo field frame having separable pole pieces and windings surrounding the pole pieces, and means for moving at least one of the pole pieces away from the other to permit the placing of the armature upon its supporting means, or for moving the pole piece toward the armature to provide a generator frame and for causing the armature to rotate and connect a commutator brush with the commutator of the armature.

7. An armature testing device comprising, in combination, means for rotatably supporting an armature, a dynamo field frame having separable pole pieces and windings surrounding the pole pieces, and means for moving at least one of the pole pieces away from the other to permit the placing of the armature upon its supporting means, or for moving the pole piece toward the armature to provide a generator frame, and for connecting the field windings with a current source and a commutator brush with the commutator of the armature.

8. An armature testing device comprising, in combination, means for rotatably supporting an armature, a dynamo field frame having separable pole pieces and windings surrounding the pole pieces, and means for moving at least one of the pole pieces away from the other to permit the placing of the armature upon its supporting means, or for moving the pole piece toward the armature to provide a generator frame, and for causing the armature to rotate, connect the field windings with a current source and a commutator brush with the commutator of the armature.

9. An armature testing device comprising, in combination, means for rotatably supporting an armature, a dynamo field frame surrounding the armature and having pole pieces and windings, commutator brushes adapted to bear upon the armature commutator, one of the brushes being movable relative to the commutator, and means for causing the movable brush to bear upon the commutator and for causing the armature to rotate.

10. An armature testing device comprising, in combination, means for rotatably supporting an armature, a dynamo field frame surrounding the armature and having pole pieces and windings, commutator brushes adapted to bear upon the armature commutator, one of the brushes being movable relative to the commutator and means for connecting the field windings with a current source and for causing the movable brush to bear upon the commutator.

11. An armature testing device comprising, in combination, means for rotatably supporting an armature, a dynamo field frame surrounding the armature and having pole pieces and windings, commutator brushes adapted to bear upon the armature commutator, one of the brushes being movable relative to the commutator and means for connecting the field windings with a current source, for causing the movable brush to bear upon the commutator and for causing the armature to rotate.

12. An armature testing device comprising, in combination, means for rotatably supporting an armature, separable dynamo field frame parts each carrying pole pieces and windings surrounding the pole pieces, commutator brushes normally engaging the commutator of the armature and movable with the field frame parts, and means for connecting the field windings with a current source and for causing the armature to rotate.

13. An armature testing device comprising, in combination, means for rotatably supporting an armature, separable dynamo field frame parts each carrying pole pieces and windings surrounding the pole pieces, commutator brushes carried by the said field frame parts, and means for moving one of the field frame parts relative to the other thereby effecting withdrawal of all commutator brushes from an armature commutator.

14. An armature testing device comprising, in combination, means for rotatably supporting an armature, separable dynamo field frame parts each carrying pole pieces and windings surrounding the pole pieces, commutator brushes carried by the said field frame parts and means for moving one of the field frame parts and the commutator brushes carried thereby relative to the other field frame part, thereby effecting withdrawal of the commutator brushes carried by the last said field frame part from an armature commutator.

15. An armature testing device, comprising in combination, means for rotatably supporting an armature, a stationary and a movable dynamo field frame part, each carrying pole pieces and windings surrounding the pole pieces, commutator brushes carried by the said field frame parts, and means for moving the movable field frame part relative to the stationary part, thereby effecting withdrawal of the commutator brushes carried by the stationary part and the movable field frame part from an armature commutator.

16. An armature testing device, comprising in combination, means for rotatably supporting an armature, a stationary part and a movable dynamo field frame part, each carrying pole pieces and windings surrounding the pole pieces, commutator brushes carried by the said field frame parts, and means for moving the movable field frame part and the commutator brushes carried thereby relative to the stationary part, thereby effecting withdrawal of the commutator brushes carried by the stationary field frame part from an armature commutator.

17. An armature testing device comprising, in combination, means for rotatably supporting an armature, said means including a bearing rotatably supporting one end of the armature shaft, and a stationary bearing half rotatably supporting the other end thereof; separable dynamo field frame parts each carrying pole pieces and windings surrounding the pole pieces; a bearing half carried by one of the field frame parts and adapted to cooperate with the stationary bearing half for rotatably supporting said other armature shaft end and preventing lateral movement thereof relative to the stationary bearing half; and means for moving at least the field frame part with the bearing half away from the other to permit the placing of the armature upon the supporting means, or for moving at least said field frame part with the bearing half toward the other field frame part to provide a generator frame and cause the bearing half to cooperate with the stationary bearing half.

18. An armature testing device comprising, in combination, means for rotatably supporting an armature, said means including a bearing rotatably supporting one end of the armature shaft, and a stationary bearing half rotatably supporting the other end thereof; a dynamo field frame having separable pole pieces and windings surrounding the pole pieces, a bearing half movable with one of the pole pieces away from the armature shaft and adapted to cooperate with the stationary bearing half for rotatably supporting said other armature shaft end and preventing lateral movement thereof relative to the stationary bearing half; and means for moving at least the pole piece with the bearing half away from the other pole piece to permit the placing of the armature upon its supporting means; or for moving at least said pole piece with the bearing half toward the armature to provide a generator frame and cause the bearing half to cooperate with the stationary bearing half.

19. An armature testing device comprising, in combination, means for rotatably supporting an armature, said means including a bearing rotatably supporting one end of the armature shaft, and a stationary bearing half rotatably supporting the other end thereof; separable dynamo field frame parts each carrying pole pieces and windings surrounding the pole pieces; a bearing half carried by one of the field frame parts and adapted to cooperate with the stationary bearing half for rotatably supporting said other armature shaft end and preventing lateral movement thereof relative to the stationary bearing half; and means for moving at least the field frame part with the bearing half away from the other to permit the placing of the armature upon the supporting means, or for moving at least said field frame part with the bearing half toward the other field frame part to provide a generator frame and cause the bearing half to cooperate with a stationary bearing half, and connect the field windings with a current source.

20. An armature testing device comprising, in combination, means for rotatably supporting an armature, said means including a bearing rotatably supporting one end of the armature shaft, and a stationary bearing half rotatably supporting the other end thereof; a dynamo field frame having separable pole pieces and windings surrounding the pole pieces a bearing half movable with one of the pole pieces away from the armature shaft and adapted to cooperate with the stationary bearing half for rotatably supporting said other armature shaft end and preventing lateral movement thereof relative to the stationary bearing half; and means for moving at least the pole piece with the bearing half away from the other pole piece to permit the placing of the armature upon its supporting means, or for moving at least said pole piece with the bearing half toward the armature to provide a generator frame and cause the bearing half to cooperate with the stationary bearing half and connect the field windings with a current source.

21. An armature testing device comprising, in combination, means for rotatably supporting an armature, said means including a bearing rotatably supporting one end of the armature shaft, and a stationary bearing half rotatably supporting the other end thereof; separable dynamo field frame parts each carrying pole pieces and windings surrounding the pole pieces; a bearing half carried by one of the field frame parts and adapted to cooperate with the stationary bearing half for rotatably supporting said other armature shaft end and preventing lateral movement thereof relative to the stationary bearing half; means for moving at least the field frame part with the bearing half away from the other to permit the placing of the armature upon the supporting means, or for moving at least said field frame part with the bearing half toward the other field frame part to provide a generator frame and cause the bearing half to cooperate with the stationary bearing half, and connect a commutator brush with the commutator of the armature.

22. An armature testing device comprising, in combination, means for rotatably supporting an armature said means including a bearing rotatably supporting one end of the armature shaft, and a stationary bearing half rotatably supporting the other end thereof; a dynamo field frame having separable pole pieces and windings surrounding the pole pieces, a bearing half movable with one of the pole pieces away from the armature shaft and adapted to cooperate with the stationary bearing half for rotatably supporting said other armature shaft end and preventing lateral movement thereof relative to the stationary bearing half; and means for moving at least the pole piece with the bearing half away from the other pole piece to permit the placing of the armature upon its supporting means, or for moving at least said pole piece with the bearing half toward the armature to provide a generator frame and cause the bearing half to cooperate with the stationary bearing half, and connect a commutator brush with the commutator of the armature.

23. An armature testing device comprising, in combination, means for rotatably supporting an armature, said means including a bearing rotatably supporting one end of the armature shaft, and a stationary bearing half rotatably supporting the other end thereof; separable dynamo field frame parts each carrying pole pieces and windings surrounding the pole pieces; a bearing half carried by one of the field frame parts and adapted to cooperate with the stationary bearing half for rotatably supporting said other armature shaft end and preventing lateral movement thereof relative to the stationary bearing half; means for moving at least the field frame part with the bearing half away from the other to permit the placing of the armature upon the supporting means, or for moving at least said field frame part with the bearing half toward the other field frame part to provide a generator frame and cause the bearing half to cooperate with the stationary bearing half, and connect the field windings with a current source and cause the armature to rotate.

24. An armature testing device comprising, in combination, means for rotatably supporting an armature, said means including a bearing rotatably supporting one end of the armature shaft, and a stationary bearing half rotatably supporting the other end thereof; a dynamo field frame having separable pole pieces and windings surrounding the pole pieces, a bearing half movable with one of the pole pieces away from the armature shaft and adapted to cooperate with the stationary bearing half for rotatably supporting said other armature shaft end and preventing lateral movement thereof relative to the stationary bearing half; means for moving at least the pole piece with the bearing half away from the other pole piece to permit the placing of the armature upon its supporting means; or for moving at least said pole piece with the bearing half toward the armature to provide a generator frame and cause the bearing half to cooperate with the stationary bearing half, and connect the field windings with a current source and a commutator brush with the commutator of the armature.

25. An armature testing device comprising, in combination, means for rotatably supporting an armature, a chuck drivingly engaging the armature shaft; a prime mover; a normally yieldingly separated friction clutch adapted drivingly to connect the prime mover with the chuck; separable dynamo field frame parts, each carrying pole pieces and windings surrounding the pole pieces; and means for moving at least one of the field frame parts away from the other to permit the placing of the armature upon the supporting means, or for moving at least said field frame part toward the other field frame part to provide a generator frame and drivingly connect the friction clutch.

26. An armature testing device comprising, in combination, means for rotatably supporting an armature, said means including a chuck drivingly supporting one end of the armature shaft; a stationary bearing half rotatably supporting the other end thereof; a prime mover; a normally yieldingly separated friction clutch adapted drivingly to connect the prime mover with the chuck; separable dynamo field frame parts each carrying pole pieces and windings surrounding the pole pieces; a bearing half carried by one of the field frame parts and adapted to cooperate with the stationary bearing half for rotatably supporting said other armature shaft end and prevent lateral movement thereof relative to the stationary bearing half; means for moving at least the field frame part with the bearing half away from the other to permit the placing of the armature upon the supporting means, or for moving at least said field frame part with the bearing half toward the other field frame part to provide a generator frame and cause the bearing half to cooperate with the stationary bearing half, and drivingly connect the friction clutch.

27. An armature testing device comprising, in combination, means for rotatably supporting an armature, separable dynamo field frame parts, each carrying pole pieces and windings surrounding the pole pieces; means for moving at least one of the field frame parts away from the other to permit the placing of the armature upon the supporting means, or for moving at least one of the field frame parts toward the other field frame part to provide a generator frame; and means moving in response to relative movement between the field frame parts for connecting the field windings with a current source.

28. An armature testing device comprising, in combination, means for rotatably supporting an armature, separable dynamo field frame parts, each carrying pole pieces and windings surrounding the pole pieces; means for moving at least one of the field frame parts away from the other to permit the placing of the armature upon the supporting means, or for moving at least one of the field frame parts toward the other field frame part to provide a generator frame; and means moving in response to movement of at least one field frame part toward the other for connecting the field windings with a current source.

29. An armature testing device comprising, in combination, means for rotatably supporting an armature; separable dynamo field frame parts, each carrying pole pieces and windings surrounding the pole pieces; means for moving at least one of the field frame parts away from the other to permit the placing of the armature upon the supporting means, or for moving at least one of the field frame parts toward the other field frame part to provide a generator frame; a normally open switch adapted to connect the field windings with a current source; and a cam rotated in response to relative movement between the field frame parts for closing said switch.

30. An armature testing device comprising, in combination, means for rotatably supporting an armature, separable dynamo field frame parts, each carrying pole pieces and windings surrounding the pole pieces; means for moving at least one of the field frame parts away from the other to permit the placing of the armature upon the supporting means, or for moving at least one of the field frame parts toward the other field frame part to provide a generator frame; a normally open switch adapted to connect the field windings with a current source; and a cam rotated in response to movement of at least one field frame part toward the other for closing said switch.

In testimony whereof I hereto affix my signature.

RUPERT C. WHELCHEL.